US012770805B2

(12) United States Patent
Tannhäuser

(10) Patent No.: US 12,770,805 B2
(45) Date of Patent: Oct. 20, 2026

(54) CIRCUIT BREAKER AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 18/696,498

(22) PCT Filed: Sep. 16, 2022

(86) PCT No.: PCT/EP2022/075728
§ 371 (c)(1),
(2) Date: Mar. 28, 2024

(87) PCT Pub. No.: WO2023/052146
PCT Pub. Date: Apr. 6, 2023

(65) Prior Publication Data

US 2025/0046539 A1 Feb. 6, 2025

(30) Foreign Application Priority Data

Sep. 28, 2021 (DE) ..................... 10 2021 210 828.8

(51) Int. Cl.
*H01H 9/54* (2006.01)

(52) U.S. Cl.
CPC .................................. *H01H 9/548* (2013.01)

(58) Field of Classification Search
CPC ...................................................... H01H 9/548
USPC .......................................................... 361/100
See application file for complete search history.

(56) References Cited

U.S. PATENT DOCUMENTS

2005/0243491 A1* 11/2005 Tanis ..................... H02H 3/046 361/104
2008/0204951 A1 8/2008 Hull
2017/0256934 A1* 9/2017 Kennedy .............. H02H 7/0855
2020/0365346 A1 11/2020 Telefus et al.
(Continued)

FOREIGN PATENT DOCUMENTS

DE 4432643 A1 3/1996
DE 102019213604 A1 3/2021
DE 102021210810 A1 3/2023
(Continued)

*Primary Examiner* — Michael R. Fin
(74) *Attorney, Agent, or Firm* — Laurence A. Greenberg; Werner H. Stemer; Ralph E. Locher

(57) ABSTRACT

A circuit breaker protects an electric low-voltage circuit, and has: a) the function of ascertaining a level of a differential current of the low-voltage circuit, b) a mechanical separating contact unit so that an opening function of contacts is switched to prevent a current flow or a closing function of the contacts is switched for a current flow in the low-voltage circuit, and c) an electronic interruption unit which is connected to the mechanical separating contact unit in series and which, as a result of semiconductor-based switch elements, is switched to a high-ohmic state of the switch elements to prevent a current flow or a low-ohmic state of the switch elements for a current flow in the low-voltage circuit. The ascertained level of the differential current is compared with a differential current threshold and if the current threshold is exceeded, the current flow in the low-voltage circuit is prevented.

24 Claims, 4 Drawing Sheets

(56) References Cited

U.S. PATENT DOCUMENTS

2022/0337046 A1 10/2022 Erven

FOREIGN PATENT DOCUMENTS

| | | | |
|---|---|---|---|
| DE | 102021210815 | A1 | 3/2023 |
| DE | 102021210820 | A1 | 3/2023 |
| DE | 102021210821 | A1 | 3/2023 |
| DE | 102021210834 | A1 | 3/2023 |
| EP | 0570603 | B1 | 11/1996 |
| EP | 2448075 | A1 | 5/2012 |

* cited by examiner

CIRCUIT BREAKER AND METHOD

FIELD AND BACKGROUND OF THE INVENTION

The invention relates to the technical field of a circuit breaker device, in particular for detecting fault currents, for a low-voltage circuit having an electronic interruption unit and to a method for a circuit breaker device, in particular for detecting fault currents, for a low-voltage circuit having an electronic interruption unit.

Low voltage is used to mean voltages of up to 1000 volts AC or up to 1500 volts DC. Low voltage is used to mean, in particular, voltages which are greater than the extra-low voltage, with values of 50 volts AC or 120 volts DC.

A low-voltage circuit or network or system is used to mean circuits having nominal currents or rated currents of up to 125 amperes, more specifically up to 63 amperes. A low-voltage circuit is used to mean, in particular, circuits having nominal currents or rated currents of up to 50 amperes, 40 amperes, 32 amperes, 25 amperes, 16 amperes, 10 amperes or 6 amperes. The current values mentioned are used to mean, in particular, nominal, rated or/and switch-off currents, that is to say the current which is normally conducted at most via the circuit, or for which the electrical circuit is usually interrupted, for example by a protection device such as a circuit breaker device, a miniature circuit breaker or a power circuit breaker.

Miniature circuit breakers are overcurrent protection devices which have been known for a long time and are used in electrical installation technology in low-voltage circuits. They protect lines from damage caused by heating on account of an excessively high current and/or a short circuit. A miniature circuit breaker can automatically switch off the circuit in the event of an overload and/or a short circuit.

A miniature circuit breaker is a fuse element which does not automatically reset.

In contrast to miniature circuit breakers, power circuit breakers are provided for currents of greater than 125 A, sometimes also even above 63 amperes. Miniature circuit breakers therefore have a simpler and more delicate design. Miniature circuit breakers usually have a fastening possibility for fastening on a so-called top-hat rail (mounting rail, DIN rail, TH35).

Miniature circuit breakers have an electromechanical design. In a housing, they have a mechanical switching contact or shunt opening release for interrupting (tripping) the electrical current. A bimetallic protection element or bimetallic element usually is used for tripping (interruption) in the case of a longer-lasting overcurrent (overcurrent protection) or in the event of a thermal overload (overload protection). An electromagnetic release with a coil is used for brief tripping if an overcurrent limit value is exceeded or in the event of a short circuit (short-circuit protection). One or more arc quenching chamber(s) or arc quenching devices are provided. Connection elements for conductors of the electrical circuit to be protected are also provided.

Fault current circuit breakers for electrical circuits, in particular for low-voltage circuits or systems, are generally known. Fault current circuit breakers are also referred to as Residual Current Devices, RCD for short. Fault current circuit breakers determine the current sum in an electrical circuit, which is normally zero, and interrupt the electrical circuit if a differential current value is exceeded, that is to say a current sum that is not equal to zero and exceeds a certain (differential) current value or fault current value.

Almost all previous fault current circuit breakers have a summation current transformer, the primary winding of which is formed by the conductors of the circuit and the secondary winding of which outputs the current sum which is used directly or indirectly to interrupt the electrical circuit.

For this purpose, two or more conductors, usually outgoing and return conductors or outer and neutral conductors in a single-phase AC network, all three outer conductors or all three outer conductors and the neutral conductor in a three-phase AC network, are routed through a current transformer usually having an annular core made ferromagnetic material. Only the differential current, that is to say a current differing from the outgoing and return currents, from the conductors is converted. The current sum in an electrical circuit is usually equal to zero. Fault currents can therefore be detected.

If, for example, a current flows away to ground on the energy sink side or the consumer side, a fault current is referred to in this context. There is a fault, for example, when there is an electrical connection from a phase conductor of the electrical circuit to ground, for example when a person touches the phase conductor. Part of the electrical current then does not flow back via the neutral conductor or zero conductor, as usual, but rather via the person and ground. This fault current can now be captured with the aid of the summation current transformer since the absolute value of the captured sum of the current flowing out and the current flowing back is not equal to zero. The circuit, for example at least one line, some of the lines or all of the lines, is interrupted via a relay or a holding magnet release, for example with a connected mechanism. Fault current circuit breakers for capturing AC fault currents are generally known from the document DE 44 32 643 A1.

The main function of fault current circuit breakers is to protect persons from electrical currents (electric shock) and to protect systems, machines or buildings from fire caused by electrical insulation faults.

If the fault current circuit breaker or its summation current transformer is designed such that the secondary-side energy of the summation current transformer suffices to actuate a release unit or an interruption unit or a release, such fault current circuit breakers are referred to as being independent of the network voltage.

If auxiliary energy is required or used for the trip circuit and is generally generated by a power supply unit provided in the fault current circuit breaker, such fault current circuit breakers are referred to as being dependent on the network voltage. That is to say, fault current circuit breakers that are dependent on the network voltage contain a power supply unit for supplying energy to a fault current detection means (not independent of the network voltage). These power supply units are needed, for example, to detect fault currents in DC voltage networks and mixed DC/AC networks or in circuits with high frequencies.

A fault current circuit breaker substantially consists of the functional groups of summation current transformer, trip circuit, holding magnet release, mechanism and contacts. A test circuit with a test button and a test resistor is also usually provided. The functionality of the fault current circuit breaker or the fault current protection device can be checked using the test button.

There are different types of fault current circuit breakers which are denoted using letters or combinations of letters, such as AC, A, F, G, K, S, B, B+. Each type captures a certain type of fault current. Two-pole fault current circuit breakers for the phase and neutral conductors (L+N), three-pole fault current circuit breakers for three phase conductors (L1, L2, L3) and four-pole fault current circuit breakers for three phase conductors and a neutral conductor (L1, L2, L3, N) are currently known.

For example, type AC circuit breakers capture only purely sinusoidal fault currents. Type A circuit breakers capture both purely sinusoidal alternating currents and pulsating DC fault currents. Type F circuit breakers are mixed-frequency-sensitive fault current protection devices. They capture all types of fault currents like type A and are also suitable for capturing fault currents consisting of a frequency mixture of frequencies up to 1 kHz. Type K circuit breakers comprise the characteristics of type A circuit breakers, but have a short delay in their switch-off behavior. Type S circuit breakers are selective fault current circuit breakers which can be graduated in terms of the rated differential current and in terms of the tripping time.

Circuit breaker devices having an electronic interruption unit are relatively new developments. They have a semiconductor-based electronic interruption unit. That is to say, the electrical current flow in the low-voltage circuit is conducted via semiconductor components or semiconductor switches which can interrupt the electrical current flow or can be switched to be conductive. Circuit breaker devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current of the low-voltage circuit to be protected is conducted both via the mechanical isolating contact system and via the electronic interruption unit.

The present invention relates, in particular, to low-voltage AC circuits having an AC voltage, usually having a time-dependent sinusoidal AC voltage of the frequency f. The temporal dependence of the instantaneous voltage value u(t) of the AC voltage is described by the equation:

$$u(t) = U * \sin(2\pi * f * t),$$

where:

u(t)=instantaneous voltage value at the time t

U=amplitude of the voltage

A harmonic AC voltage can be represented by the rotation of a phasor, the length of which corresponds to the amplitude (U) of the voltage. The instantaneous deflection is the projection of the phasor onto a coordinate system. An oscillation period corresponds to a full revolution of the phasor and its full angle is 2π (2pi) or 360°. The angular frequency is the rate of change of the phase angle of this rotating phasor. The angular frequency of a harmonic oscillation is always 2n times its frequency, that is to say:

$$\omega = 2\Pi^* f = 2\Pi/T = \text{angular frequency of the AC voltage}$$

(T=period duration of the oscillation)

It is often preferred to give the angular frequency (ω) rather than the frequency (f), since many formulae in oscillation theory can be represented more compactly using the angular frequency due to the occurrence of trigonometric functions, the period of which is by definition 2 π:

$$u(t) = U * \sin(\text{wt})$$

In the case of angular frequencies that are not constant over time, the term instantaneous angular frequency is also used.

In the case of a sinusoidal AC voltage, in particular an AC voltage that is constant over time, the time-dependent value formed from the angular velocity ω and the time t corresponds to the time-dependent angle φ(t) which is also referred to as the phase angle φ(t). That is to say, the phase angle φ(t) periodically passes through the range 0 . . . 2π or 0° . . . 360°. That is to say, the phase angle periodically assumes a value of between 0 and 2n or 0° and 360° (φ=n*(0 . . . 2π) or φ=n*(0° . . . 360°) on account of periodicity; in abbreviated form: φ=0 . . . 2n or φ=0° . . . ) 360°.

The instantaneous voltage value u(t) is therefore used to mean the instantaneous value of the voltage at the time t, that is to say, in the case of a sinusoidal (periodic) AC voltage, the value of the voltage at the phase angle φ(φ=0 . . . 2π or φ=0° . . . 360°, of the respective period). Electronic fault current protection devices, in which the fault current is detected electronically (dependent on the network voltage), are not allowed in various regions (for example Germany). A reason for this is the network-voltage-dependent detection and switch-off in the event of a fault. This results in the fault current detection no longer functioning below a limit of the network voltage. According to section 9.17.1 of DIN EN 61008, a fault current circuit breaker must nowadays trip independently if this cut-off voltage is undershot and must change to the isolated off state in order to prevent an unprotected on state. If the device does not trip, a dangerous situation may arise, since the branch is switched on and the fault current protection is no longer ensured.

On the other hand, the device must be manually connected again following tripping, which is complicated since a person must manually switch on the fault current circuit breaker.

SUMMARY OF THE INVENTION

The object of the present invention is to improve a circuit breaker device, in particular for capturing fault currents, of the type mentioned at the outset, in particular to achieve safe states, in particular during fault current detection, and to provide a new concept for such a circuit breaker device.

This object is achieved by means of a circuit breaker device having the features of the independent circuit breaker device patent claim and by means of a method according to the independent method patent claim.

The invention provides a circuit breaker device for protecting an electrical low-voltage circuit, in particular a low-voltage AC circuit, in particular for capturing fault currents (differential currents), having:

- a housing with network-side and load-side connections for conductors of the low-voltage circuit,
- a (first) voltage sensor unit for determining the level of the voltage of the low-voltage circuit,
- a fault current sensor unit for determining the level of a differential current of the conductors of the low-voltage circuit,
- a mechanical isolating contact unit, with the result that opening of contacts in order to avoid a current flow or closing of the contacts for a current flow in the low-voltage circuit can be switched so that (in particular) DC isolation can be switched in the low-voltage circuit;

in the case of a mechanical isolating contact unit, opening of contacts is also referred to as disconnection and closing of contacts is referred to as connection;

an electronic interruption unit which is connected in series with the mechanical isolating contact unit on the circuit side and can be switched, by means of semiconductor-based switching elements, to a high-impedance (in particular non-conductive) state of the switching elements in order to avoid a current flow or a low-impedance (in particular conductive) state of the switching elements for the current flow in the low-voltage circuit;

in the case of an electronic interruption unit, a high-impedance state of the switching elements is also referred to as a switched-off state (process: switching off) and a low-impedance state of the switching elements is referred to as a switched-on state (process: switching on);

a control unit which is connected to the voltage sensor unit, the fault current sensor unit, the mechanical isolating contact unit and the electronic interruption unit, wherein avoidance of a current flow in the low-voltage circuit is switched (in order to avoid the fault current) a differential current limit value is exceeded.

The circuit breaker device is configured in such a manner that, when the contacts of the circuit breaker device are closed and the electronic interruption unit has a low impedance, the electronic interruption unit comes to have a high impedance when a voltage-reduced state of the low-voltage circuit occurs, and that, after leaving the voltage-reduced state, the electronic interruption unit comes to have a low impedance again.

The fact that the electronic interruption unit comes to have a high impedance and a low impedance (on account of the voltage-reduced state and its cessation) is related to the functionality of the network-voltage-dependent differential current capture (by means of the fault current sensor unit).

That is to say, when a voltage-reduced state of the low-voltage circuit occurs, the electronic interruption unit comes to have a high impedance before the determination of the differential current (of the conductors of the low-voltage circuit by means of the fault current sensor unit) stops.

After leaving the voltage-reduced state, the electronic interruption unit comes to have a low impedance again only after the determination of the differential current (of the conductors of the low-voltage circuit by means of the fault current sensor unit) has started.

In particular, the voltage-reduced state is a voltage-free or approximately voltage-free state of the low-voltage circuit.

That is to say, for example, when the contacts of the circuit breaker device are closed in the (approximately) voltage-free state of the low-voltage circuit, the electronic interruption unit has a high impedance. After the voltage has been applied again, the electronic interruption unit comes to have a low impedance.

This has the particular advantage that, after a voltage-reduced state or voltage failure in the low-voltage circuit, the circuit breaker device automatically enables a current flow again (if it was previously switched on/the contacts were closed). It is advantageously not necessary to separately manually switch on the circuit breaker device, which quickly becomes complicated after a voltage failure in the case of a relatively large number of circuit breaker devices.

Furthermore, no unsafe state of the circuit breaker device can advantageously of arise on account an invalid (excessively low) network voltage (the circuit breaker device is always in safe states and consequently so is the low-voltage circuit to be protected).

Advantageous configurations of the invention are specified in the subclaims and in the exemplary embodiment.

In one advantageous configuration of the invention, the upper limit of the voltage-reducing state is less than or equal to the lower limit of the operating voltage range of the circuit breaker device.

In the case of a low-voltage circuit having an operating voltage or nominal voltage of 230 volts, the lower limit of the operating voltage range is, for example, a value in the range of 50 volts to 196 volts (85% of the nominal voltage, in the case of a nominal voltage of 230 volts), that is to say, for example, 50 V, 60 V, 70 V, 80 V, 85 V, 90 V, 100 V, 110 V, 115 V, 120 V, 130 V, 140 V, 150 V, 160 V, 170 V, 180 V, 190 V, 196 V.

The upper limit of the voltage-reducing range in the circuit breaker device can be advantageously configurable, for example according to a value from the aforementioned range and generally a value of less than the nominal voltage.

Alternatively, the lower limit of the operating voltage range may advantageously be the highest value of the (protective) extra-low voltage, usually 50 volts AC or 120 volts DC, for example.

The circuit breaker device can consequently be configured in such a manner that, when the contacts of the circuit breaker device are closed (connected state) and the electronic interruption unit has a low impedance (switched-on state), the electronic interruption unit comes to have a high impedance if a voltage-reduced state (that is to say, for example, a) below the operating voltage range, b) in the voltage-free state or c) less than the maximum value of the protective extra-low voltage) of the low-voltage circuit occurs. After leaving the voltage-reduced state (return of the voltage; return to the operating voltage range; especially a fault-free state), the electronic interruption unit comes to have a low impedance again.

This has the particular advantage that the circuit breaker device, on the one hand, automatically enables a current flow again (if it was previously connected/the contacts were closed). It is advantageously not necessary to separately switch on the circuit breaker device, which quickly becomes complicated after a voltage failure in the case of a relatively large number of circuit breaker devices. On the other hand, the circuit breaker device always establishes a safe state of the low-voltage circuit. If it is in the operating voltage range, the protective functions of the circuit breaker device are ensured by the circuit breaker device. If the voltage of the low-voltage circuit falls below the operating voltage range of the circuit breaker device, a high-impedance state is established, with the result that an unprotected dangerous voltage (even if it is less than the nominal voltage) cannot be present in the low-voltage circuit. If the voltage-reducing state is left again, that is to say, for example, the voltage is in the operating voltage range, the protective functions of the circuit breaker device are provided by the circuit breaker device again. A safe state is therefore always provided. The (lower) operating voltage range limit can advantageously be adjusted/configured.

In one advantageous configuration of the invention, the circuit breaker device can be configured in such a manner that the behavior of the circuit breaker device after leaving the voltage-reduced state can be set/configured. In particular, the circuit breaker device can be configured in such a manner that it is possible to set/configure the electronic interruption unit to come to have a low impedance or to remain with a high impedance after leaving the voltage-reduced state. This has the particular advantage that a user can deliberately configure the behavior of the circuit breaker device. The setting of "remaining with a high impedance after leaving the voltage-reduced state" may be advantageous, in particular, for dangerous systems or applications that jeopardize safety. The setting of "coming to have a low impedance after leaving the voltage-reduced state" may be advantageous, in particular, for systems with a high required system availability.

In one advantageous configuration of the invention, after leaving the voltage-reduced state, the electronic interruption unit comes to have a low impedance only if a checking function allows a low-impedance state of the switching elements.

This has the particular advantage that, on the one hand, increased operational safety is achieved, wherein a device with defective protective functions, for example, in which the checking function does not allow a low-impedance state, does not switch on as a current-carrying device that undertakes protective functions in the circuit.

On the other hand, a completely new operating concept is introduced, in which, although a user of the circuit breaker device can connect the latter (that is to say close the contacts of the mechanical isolating contact unit by means of the mechanical handle), for example, he cannot switch it on (no low-impedance state of the switching elements of the electronic interruption unit). Switching-on is carried out solely by the circuit breaker device itself. The user cannot force switching-on of the circuit breaker device, that is to say a current flow in the low-voltage circuit. In particular, the user cannot force switching-on of the circuit breaker device-even in the fault-free state of the circuit breaker device or in the fault-free case of the low-voltage circuit (for example no fault current), especially not after a voltage failure or a voltage reduction.

In one advantageous configuration of the invention, a communication unit, which is connected to the control unit and emits, in particular, a message relating to the electronic interruption unit coming to have a low impedance after leaving the voltage-reduced state, is provided.

This has the particular advantage that such an event can be reported to a superordinate controller or a management system, with the result that there is information relating to voltage failures or restored operational readiness/energy supply.

In one advantageous configuration of the invention, a display unit for displaying information is provided on the circuit breaker device and is connected to the control unit. The display unit can display in particular states of the circuit breaker device. The display unit can display, in particular, a message relating to the electronic interruption unit coming to have a low impedance after the voltage has been applied again.

The information display can display in particular the (switching) state of the switching elements of the electronic interruption unit or/and in particular the position of the contacts of the mechanical isolating contact unit.

This has the particular advantage that a user can quickly identify the (switching) state of the circuit breaker device, in particular the (switching) state of the electronic interruption unit.

In particular, a user is advantageously informed about when the voltage-reduced state is left or about the restored operational readiness/energy supply on the device.

In one advantageous configuration of the invention, the checking function comprises a self-test of the functionality of the circuit breaker device, in which at least one component, in particular a plurality of components,
of a unit, in particular of a plurality of units,
of the circuit breaker device is (are) checked,
and, in the event of functionality of the at least one component, in particular of a plurality of components,
of a unit, in particular of a plurality of units,
the low-impedance state (of the electronic interruption unit) is allowed.

For example, a self-test of the functionality of at least one component of a unit of the circuit breaker device may involve values delivered to the control unit by the component of the unit or by the unit, for example the voltage sensor unit or fault current sensor unit, for example values of the determined level of the voltage or differential current, not exceeding defined limit values (upper or/and lower limit values).

This has the particular advantage that a circuit breaker device with faulty or defective components or units is not switched on (no current flow through high-impedance switching elements is enabled), thus achieving increased operational safety in the low-voltage circuit.

In one advantageous configuration of the invention, the functionality of the electronic interruption unit is checked in order to determine whether the semiconductor-based switching element is functional.

This can be carried out, for example, by briefly switching on the electronic interruption unit, that is to say briefly switching the semiconductor-based switching element to a low impedance. In this case, briefly is used to mean a certain period of time, in particular a period of time of less than 1 ms or less than 5 ms.

Furthermore, briefly is used to mean a time range of the phase angle of an AC voltage, in which the instantaneous voltage value u(t) of the AC voltage, in particular the absolute value of the instantaneous voltage value, is less than a particular voltage value, for example less than or equal to 50 volts. That is to say, if the (absolute value of the) instantaneous voltage value (=instantaneous value of the voltage) is less than 50 volts, the electronic interruption unit can be switched to a low impedance for this period/this period of time or part of this period/this period of time in order to check the functionality. The level of the current or the level of the voltage at the load-side connection, which is determined during this brief switching-on, for example by a second voltage sensor unit, can be evaluated in order to infer a functionality of the electronic interruption unit or of the semiconductor-based switching element. If the same voltage level as at the network-side connection is present at the load-side connection during the brief switching-on, the electronic interruption unit or the semiconductor-based switching element, for example, is functional (if there is no short circuit at the load-side connection). In addition, the level of the current can therefore be evaluated in a parallel manner.

This has the particular advantage that a circuit breaker device with a faulty or defective electronic interruption unit is not switched on (no current flow through high-impedance switching elements is enabled), thus achieving increased operational safety in the low-voltage circuit. Furthermore, there is a simple possible way of checking the functionality of the electronic interruption unit.

In one advantageous configuration of the invention, the functionality of the electronic interruption unit is checked in order to determine whether an overvoltage protection component, such as an energy absorber or overvoltage protection element, of the electronic interruption unit is functional.

The check can be carried out, for example, by briefly switching on the electronic interruption unit, that is to say briefly switching the semiconductor-based switching element to a low impedance, see above. A check can be carried out by monitoring the level of the voltage or/and the current, since an overvoltage protection component generally generates, during such switching processes, short-term current flows which can be evaluated. Functionality can be inferred therefrom.

This has the particular advantage that a circuit breaker device with a faulty or defective electronic interruption unit is not switched on (no current flow through high-impedance switching elements is enabled), thus achieving increased operational safety in the low-voltage circuit. Furthermore, there is a simple possible way of checking the functionality of a component of the electronic interruption unit.

In one advantageous configuration of the invention, the (first) voltage sensor unit is checked with regard to its functionality for determining the level of the voltage. This can be carried out, for example, on the one hand, by virtue of the (first) voltage sensor unit providing values for the level of the voltage that do not exceed defined limit values (upper or/and lower limit values) and/or are in an expected range of values.

Alternatively, this can be carried out by providing a second voltage sensor unit, for example the first voltage sensor unit at the network-side connection and a second voltage sensor unit at the load-side connection, in which case both voltage values are compared with one another, in particular when the electronic interruption unit (and closed contacts) is switched off/switched on. Conclusions about the functionality for determining the level of the voltage can be drawn from corresponding differences in the levels of the voltage, for example when the electronic interruption unit is switched on. If the voltage difference is too high, for example, there is no functionality.

This has the particular advantage that a circuit breaker device with a faulty or defective voltage sensor unit is not switched on (no current flow through high-impedance switching elements is enabled), thus achieving increased operational safety in the low-voltage circuit. Furthermore, there is a simple possible way of checking the functionality of a unit, of the voltage sensor unit or of the electronic interruption unit.

In one advantageous configuration of the invention, the circuit breaker device is configured in such a manner that the temperature of the device, of a unit or/and of a component is monitored. In particular, it is advantageous in this case to monitor the temperature of the microprocessor, of the semiconductor-based switching elements or of other semiconductor elements.

If the temperature exceeds particular temperature limit values, functionality is lacking or is at risk.

This has the particular advantage that a circuit breaker device with non-functional units or components is not switched on (no current flow through high-impedance switching elements is enabled), thus achieving increased operational safety in the low-voltage circuit.

In one advantageous configuration of the invention, the checking function checks at least one, in particular a plurality or all, of the following parameters:

- checking whether the differential current limit value is exceeded,
- checking whether a first overvoltage value or/and a higher second overvoltage value or/and a higher third overvoltage value is/are exceeded, in particular at or in the region of the network-side connection,
- checking whether a first undervoltage value is undershot, in particular at or in the region of the network-side connection,
- checking whether a first temperature limit value or/and a higher second temperature limit value or/and a higher third temperature limit value is/are exceeded,
- checking parameters of the load-side connection, in particular checking whether a load-side first resistance value or/and second resistance value or a load-side first impedance value or/and second impedance value is/are undershot.

Overvoltage or overvoltage value is used here to mean that the valid operating voltage is exceeded. The levels of overvoltage dips, for example in the case of so-called bursts or surges, which can typically be 4 kV or 8 kV (in the case of a 230 volt or 400 volt network), and so-called network overvoltages (that is to say, for example, ten times the normative voltage of the low-voltage circuit), are not meant.

In particular, the first overvoltage value may be a certain percentage higher than the normative voltage value, for example 10% higher, for example in the case of a normative voltage value of 230 volts, 230 V+10%.

In particular, the second overvoltage value may be a certain higher percentage higher than the normative voltage value, for example 20% higher, for example in the case of a normative voltage value of 230 volts, 230 V+20%.

In particular, the third overvoltage value may be a certain even higher percentage higher than the normative voltage value, for example 30% higher, for example in the case of a normative voltage value of 230 volts, 230 V+30%.

This has the particular advantage that, for example, a circuit breaker device is not switched on in a network with a differing normative voltage (operating voltage) or in response to a load with incorrect parameters. For example, a lack of protection can be identified and avoided when a 230 volt circuit breaker device, for example, is incorrectly connected, for example, to the two phases with a voltage of 400 volts, and incorrect supply of a load with an excessively high voltage can be avoided. Potential destruction of the circuit breaker device associated with this can also be avoided. In a similar manner, switching-on in response to a short circuit before connecting the full supply voltage can be identified and avoided. In a similar manner, problems and a lack of protection can be avoided in the event of excessively low voltages (a 230 volt device in the 115 volt network). This achieves increased operational safety in the low-voltage circuit.

In one advantageous configuration of the invention, depending on the preceding implementation:

- overvoltage information is emitted if the first overvoltage value is exceeded,
- the electronic interruption unit comes to have a high impedance if the second overvoltage value is exceeded,
- the contacts are opened (disconnected) by means of the mechanical isolating contact unit if the third overvoltage value is exceeded,
- undervoltage information is emitted or/and the electronic interruption unit remains with a high impedance (in particular in the case of a third undervoltage limit value) if the first undervoltage value is undershot, in particular if the voltage level is greater than a second undervoltage value, temperature information is emitted if the first temperature limit value is exceeded, the electronic interruption unit comes to have a high impedance if the second temperature limit value is exceeded, the contacts are opened (disconnection) if the third temperature limit value is exceeded, impedance information is emitted if the load-side first resistance value or load-side first impedance value is undershot, or the electronic interruption unit remains with a high impedance if the load-side second resistance value or load-side second impedance value is undershot.

This has the particular advantage that defined measures—warning—remaining with a high impedance—DC isolation—are carried out in a graduated manner depending on whether certain defined parameters are exceeded or undershot. This achieves increased operational safety in the low-voltage circuit.

In one advantageous configuration of the invention, when the isolating contact unit is connected and the interruption unit has a low impedance and when a differential current that exceeds a first differential current threshold value is determined, the electronic interruption unit comes to have a high impedance and the mechanical isolating contact unit remains closed, when a differential current that exceeds a higher second differential current threshold value is determined, the electronic interruption unit comes to have a high impedance and the mechanical isolating contact unit is opened.

Furthermore:

This has the particular advantage that there is a graduated switch-off concept for a circuit breaker device according to the invention.

In one advantageous configuration of the invention, the circuit breaker device is configured in such a manner that the contacts of the mechanical isolating contact unit can be opened, but not closed, by the control unit.

This has the particular advantage that increased operational safety is achieved in the low-voltage circuit, in particular remote electronic connection is not possible.

In one advantageous configuration of the invention, the mechanical isolating contact unit can be manually operated by means of a mechanical handle on the device in order to switch opening of contacts in order to avoid a current flow or closing of the contacts for a current flow.

This has the particular advantage that the conventional functionality of a fault current circuit breaker is provided.

In one advantageous configuration of the invention, the contact position of the mechanical isolating contact unit is (mechanically) indicated.

This has the particular advantage that it is possible to visually check the contact position even in the deenergized state. This achieves increased operational safety in the low-voltage circuit.

In one advantageous configuration of the invention, the mechanical isolating contact unit has a trip-free mechanism in such a manner that, when opening of the contacts is initiated after the beginning of a process of closing the contacts, the contacts return to the opening position even if the closing process is still maintained.

In other words, the moving contacts return to the open position and remain there if the opening of the contacts is initiated after the beginning of the process of closing the contacts even when the process of closing the contacts is maintained by means of the handle.

This has the particular advantage that increased operational safety is achieved in the low-voltage circuit. In the case of connection in response to an unrecognized (unknown) short circuit, the user actuates the handle of the mechanical 13 isolating contact unit and would thus like to close the contacts. However, the contacts must open in the event of a short circuit, which is opposed to the operating direction (the closing of the contacts by the operator). Only the (fast) opening of the contacts counter to the operating direction prevents a major fault. A current sensor unit can be provided.

The invention claims a corresponding method for a circuit breaker device for a low-voltage circuit having electronic (semiconductor-based) switching elements with the same and further advantages.

The method for a circuit breaker device, in particular for detecting fault currents, for protecting an electrical low-voltage circuit comprising:

determination of the level of a differential current of the low-voltage circuit, a mechanical isolating contact unit, with the result that opening of contacts in order to avoid a current flow or closing of the contacts for a current flow in the low-voltage circuit can be switched, an electronic interruption unit which is connected in series with the mechanical isolating contact unit on the circuit side and can be switched, by means of semiconductor-based switching elements, to a high-impedance state of the switching elements in order to avoid a current flow or a low-impedance state of the switching elements for the current flow in the low-voltage circuit, wherein the determined level of the differential current is compared with at least one differential current limit value and avoidance of the current flow in the low-voltage circuit is switched if the differential current limit value is exceeded, wherein, when the contacts of the circuit breaker device are closed and the electronic interruption unit has a low impedance, the electronic interruption unit comes to have a high impedance when a voltage-reduced state of the low-voltage circuit occurs, and wherein the electronic interruption unit comes to have a low impedance again after leaving the voltage-reduced state.

The invention claims a corresponding computer program product. The computer program product comprises instructions which, when the program is executed by a microcontroller (for example in the control unit), cause the latter to change the electronic interruption unit for a circuit breaker device to a low impedance. The microcontroller is part of the circuit breaker device, in particular the control unit.

The invention claims a corresponding computer-readable storage medium on which the computer program product is stored.

The invention claims a corresponding data carrier signal which transmits the computer program product.

All configurations, both in dependent form referring back to the independent claims, and referring back only to individual features or combinations of features of patent claims, in particular also a reference of the dependent arrangement claims back to the independent method claim, improve a circuit breaker device, in particular improve the safety of the circuit breaker device, and provide a new concept for a circuit breaker device.

The described properties, features and advantages of this invention and the manner in which they are achieved become clearer and more distinctly comprehensible in connection with the following description of the exemplary embodiments which are explained in more detail in connection with the drawing.

DETAILED DESCRIPTION OF THE INVENTION

Figure 1:
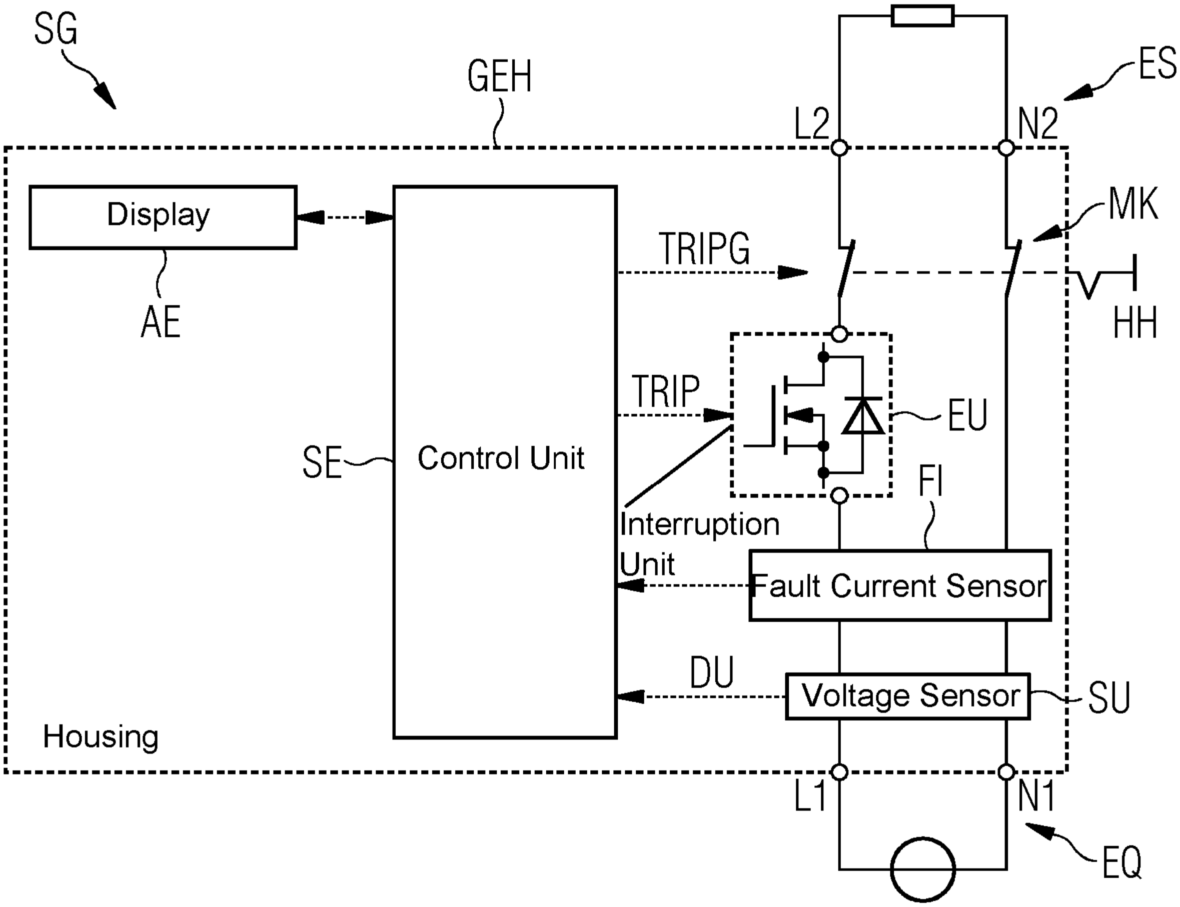
FIG. 1 shows a first illustration of a circuit breaker device.

FIG. 1 shows an illustration of a circuit breaker device SG for protecting an electrical low-voltage circuit, having a housing GEH, having:

- connections for conductors of the low-voltage circuit, in particular first network-side connections L1, N1 for a network-side, in particular energy-source-side, connection EQ of the circuit breaker device SG and second load-side connections L2, N2 for a load-side, in particular energy-sink-side—in the case of passive loads, connection ES (consumer-side connection) of the circuit breaker device SG, wherein phase-conductor-side connections L1, L2 and neutral-conductor-side connections N1, N2 may be provided, in particular;
- the load-side connection L2, N2 may have a passive load (consumer) or/and an active load ((further) energy source) or a load which may be both passive and active, for example in a time sequence;
- a (first) voltage sensor unit SU for determining the level of the voltage of the low-voltage circuit, with the result that in particular instantaneous (phase-angle-related) voltage values DU are available,
- a fault current sensor unit FI for determining the level of a differential current of the low-voltage circuit; the fault current sensor unit may be, for example, a summation current transformer, as is usually used in fault current circuit breakers of a conventional design or according to the prior art,
- a mechanical isolating contact unit MK, in particular a mechanical isolating contact unit which can be operated and switched by means of a mechanical handle HH, with the result that opening of contacts in order to avoid a current flow or closing of the contacts for a current flow in the low-voltage circuit can be switched (in particular by means of the handle) so that (in particular) DC isolation in the low-voltage circuit can be switched;

in the case of the mechanical isolating contact unit MK, opening of contacts is also referred to as disconnection and closing of contacts is referred to as connection;

- an electronic interruption unit EU which is connected in series with the mechanical isolating contact unit on the circuit side and, by virtue of semiconductor-based switching elements, can be switched to a high-impedance state of the switching elements in order to avoid a current flow or a low-impedance state of the switching elements for the current flow in the low-voltage circuit;

in the case of the electronic interruption unit EU, a high-impedance state of the switching elements (for avoiding a current flow) is also referred to as a switched-off state (process: switch off) and a low-impedance (conductive) state of the switching elements (for the current flow) is referred to as a switched-on state (process: switch on);

- a control unit SE which is connected to the (first) voltage sensor unit SU, the fault current sensor unit FI, the mechanical isolating contact unit MK and the electronic interruption unit EU, wherein avoidance of a current flow in the low-voltage circuit is initiated when (at least) a differential current limit value is exceeded, in particular in order to avoid a fault current.

In the example, the load-side connections L2, N2 are connected to the mechanical isolating contact unit MK. The mechanical isolating contact unit MK is connected, on the other hand, to the electronic interruption unit EU. The electronic interruption unit EU is connected, on the other hand, to the network-side connections L1, N1. A different, in particular reverse, arrangement (mechanical isolating contact unit MK connected to the network-side connections and electronic interruption unit connected to the load-side connections) is likewise possible.

The (first) voltage sensor unit SU and the fault current sensor unit FI can be arranged between the mechanical isolating contact unit MK and the electronic interruption unit EU. The (first) voltage sensor unit SU and the fault current sensor unit FI may likewise be arranged at the network-side connection, as illustrated in FIG. 1.

The circuit breaker device SG may have an energy supply with a power supply unit NT (not depicted in FIG. 1).

The power supply unit NT is connected, on the one hand, to the conductors of the low-voltage circuit. The power supply unit NT is used, on the other hand, to supply energy to the control unit SE or/and the electronic interruption unit EU and possibly the (first) voltage sensor unit SU or/and fault current sensor unit FI.

The circuit breaker device SG, in particular the control unit SE, may have a microcontroller (=microprocessor) on which a computer program product runs, said computer program product comprising instructions which, when the program is executed by the microcontroller, cause the latter to have the electronic interruption unit come to have a low impedance after leaving the voltage-reduced state. Furthermore, to enable configurability or/and to carry out a checking function (as described above and below) for a circuit breaker device.

The computer program product can advantageously be stored on a computer-readable storage medium, such as a USB stick, a CD-ROM, etc., in order to enable an upgrade to an extended version, for example.

The computer program product may alternatively also be advantageously transmitted by means of a data carrier signal.

The control unit SE may:

- be implemented with a digital circuit, for example with a (further) microprocessor; the (further) microprocessor May also contain an analog part;
- be implemented with a digital circuit with analog circuit parts.

The circuit breaker device SG, in particular the control unit SE, is configured in such a manner that avoidance of a current flow in the low-voltage circuit is initiated when differential current limit values are exceeded (in order to avoid a fault current). This is achieved, in particular, by virtue of the electronic interruption unit EU changing from the low-impedance state to the high-impedance state. The avoidance of a current flow in the low-voltage circuit is initiated, for example, by means of a first interruption signal TRIP which is sent from the control unit SE to the electronic interruption unit EU, as depicted in FIG. 1.

According to FIG. 1, the electronic interruption unit EU is depicted with a single pole in one conductor, preferably the phase conductor in the example. This means interruption of one conductor in this first variant. At least one conductor, in particular the active conductor or phase conductor, has semiconductor-based switching elements. The neutral conductor may be free of switching elements, that is to say may be without semiconductor-based switching elements. That is to say, the neutral conductor is connected directly, that is to say does not come to have a high impedance. That is to say, only single-pole interruption (of the phase conductor) is effected.

If further active conductors/phase conductors are provided, the phase conductors have semiconductor-based switching elements in a second variant of the electronic interruption unit EU. The neutral conductor is connected directly, that is to say does not come to have a high impedance, for example for a three-phase AC circuit.

In a third variant of the electronic interruption unit EU, the neutral conductor may likewise have a semiconductor-based switching element, that is to say both conductors come to have a high impedance when the electronic interruption unit EU is interrupted (two-pole or multi-pole design).

The electronic interruption unit EU may have semiconductor components such as bipolar transistors, field-effect transistors (FET), isolated gate bipolar transistors (IGBT), metal oxide layer field-effect transistors (MOSFET) or other (self-commutated) power semiconductors. In particular, IGBTs and MOSFETs are particularly well suited to the circuit breaker device according to the invention on account of low forward resistances, high junction resistances and a good switching behavior.

In a first variant, the mechanical isolating contact unit MK can carry out single-pole interruption. That is to say, only one conductor of the two conductors, in particular the active conductor or phase conductor, is interrupted, that is to say has a mechanical contact. The neutral conductor is then free of contacts, that is to say the neutral conductor is connected directly.

If further active conductors/phase conductors are provided, the phase conductors have mechanical contacts of the mechanical isolating contact system in a second variant. The neutral conductor is connected directly in this second variant, for example for a three-phase AC circuit.

In a third variant of the mechanical isolating contact system MK, the neutral conductor likewise has mechanical contacts, as depicted in FIG. 1.

A mechanical isolating contact unit MK is used to mean, in particular, a (standards-compliant) isolating function implemented by the isolating contact unit MK. An isolating function is used to mean the following points:

- minimum clearance in air according to the standard (minimum distance between the contacts),
- contact position indication of the contacts of the mechanical isolating contact system,
- actuation of the mechanical isolating contact system always possible (no blocking of the isolating contact system), so-called trip-free mechanism according to the standard.

The minimum clearance in air between the contacts of the isolating contact system is substantially voltage-dependent. Further parameters are the pollution degree, the type of field (homogeneous, inhomogeneous) and the barometric pressure and the height above sea level.

There are corresponding rules or standards for these minimum clearances in air or creepage distances. These rules specify, for example in air for an impulse withstand voltage, the minimum clearance in air for an inhomogeneous and a homogeneous (ideal) electrical field on the basis of the pollution degree. The impulse withstand voltage is the strength when a corresponding impulse voltage is applied. The isolating contact system or circuit breaker device has an isolating function (isolator property) only when this minimum length (minimum distance) is present.

In the sense of the invention, the DIN EN 60947 or IEC 60947 series of standards, to which reference is made here, is relevant in this case to the isolator function and its properties.

The isolating contact system is advantageously characterized by a minimum clearance in air of the open isolating contacts in the OFF position (open position, open contacts) on the basis of the rated impulse withstand voltage and the pollution degree. The minimum clearance in air is, in particular, between (a minimum of) 0.01 mm and 14 mm. In particular, the minimum clearance in air is advantageously between 0.01 mm at 0.33 kV and 14 mm at 12 kV, in particular for pollution degree 1 and in particular for inhomogeneous fields.

The minimum clearance in air can advantageously have the following values:

E DIN EN 60947-1 (VDE 0660-100): 2018-06

TABLE 13

Minimum clearances in air

| Rated impulse withstand voltage $U_{imp}$ | Minimum clearances in air mm: Case A inhomogeneous field (see 3.7.63) Pollution degree | | | | Case B homogeneous field, ideal conditions (see 3.7.62) Pollution degree | | | |
|---|---|---|---|---|---|---|---|---|
| kV | 1 | 2 | 3 | 4 | 1 | 2 | 3 | 4 |
| 0.33 | 0.01 | 0.2 | 0.8 | 1.6 | 0.01 | 0.2 | 0.8 | 1.6 |
| 0.5 | 0.04 | | | | 0.04 | | | |
| 0.8 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The values of minimum clearances in air are based on the 1.2/50 μs impulse voltage, for barometric pressure of 80 kPa, equivalent to normal atmospheric pressure at 2000 m above sea level.

The pollution degrees and types of field correspond to those defined in the standards. This advantageously allows a standards-compliant circuit breaker device dimensioned according to the rated impulse withstand voltage to be achieved.

The mechanical isolating contact unit MK may alternatively or additionally be controlled by the control unit SE in order to initiate avoidance of a current flow in the low-voltage circuit if at least one differential current limit value is exceeded. DC isolation is specifically brought about in this case, if necessary. The initiation of the avoidance of a current flow or possible DC interruption of the low-voltage circuit is effected, for example, by means of a second interruption signal TRIPG which is sent from the control unit SE to the mechanical isolating contact unit (isolating contact system) MK, as depicted in FIG. 1. In particular, the opening of the contacts cannot be blocked by the handle, that is to say the contacts are opened (so-called free tripping/trip-free mechanism) even when the handle is locked (closing of the contacts).

The mechanical isolating contact unit may be configured in such a manner that position information relating to the contacts (open/closed) is determined and is transmitted to the control unit SE. The position information can be determined, for example, by a first position sensor.

Alternatively or additionally, handle information relating to the position of the handle (open/closed) can be determined and transmitted to the control unit SE. The handle information may be determined, for example, by a second position sensor.

In one advantageous configuration, interruption of the low-voltage circuit can be initiated, in particular by means of the mechanical isolating contact unit MK, when a differential current level that exceeds a second differential current threshold value is determined.

The circuit breaker device SG is configured according to the invention in such a manner that the electronic interruption unit EU has a high impedance in the disconnected state, that is to say when the contacts of the mechanical isolating contact unit MK are open. If a user of the circuit breaker device SG operates the mechanical handle for a switching-on process in order to close the contacts, a checking function is carried out, in particular after closing the contacts (that is to say connection). If the checking function provides a positive result, the electronic interruption unit EU comes to have a low impedance, and otherwise not.

That is to say, the electronic interruption unit EU comes to have a low impedance only when the checking function allows a low-impedance state of the switching elements.

The circuit breaker device SG is also configured according to the invention in such a manner that, when the contacts of the circuit breaker device are closed, the electronic interruption unit comes to have a high impedance when a voltage-reduced state of the low-voltage circuit occurs. The electronic interruption unit comes to have a low impedance again after leaving the voltage-reduced state. That is to say, a (potential) current flow in the low-voltage circuit is automatically established again, for example after a voltage failure in the low-voltage circuit, by virtue of the electronic interruption unit EU automatically coming to have a low impedance.

The behavior of the circuit breaker device after leaving the voltage-reduced state can be configurable. That is to say, in particular, it is possible to configure the electronic interruption unit to come to have a low impedance or to remain with a high impedance after leaving the voltage-reduced state.

The configuration may contain a time component. For example, the electronic interruption unit can come to have a low impedance for a voltage-reduced state that undershoots a first period of time. The electronic interruption unit remains with a high impedance in the case of a voltage-reduced state which exceeds a first period time.

The first period of time may be in the minutes range or single-digit hours range.

For example, the first period of time may be 5 h. For example, it is possible to allow the interruption unit to come to have a low impedance (switch on again) when the voltage-reduced state is present "only" for one or a few minutes or for one or a few hours. For example, the high-impedance state may be maintained if the voltage-reduced state is present for more than 4 hours, 5 h, 6 h, 7 h or 8 hours or for a day or longer.

Advantageously, after leaving the voltage-reduced state, that is to say, for example, after a voltage failure has ended, the electronic interruption unit can come to have a low impedance only when a checking function allows a low-impedance state of the switching elements.

The event of leaving the voltage-reduced state can advantageously be displayed by a display unit AE on the circuit breaker device or/and communicated by a communication unit.

The display unit AE is advantageously connected to the control unit SE, as illustrated in FIG. 1.

The communication unit (not illustrated in FIG. 1) is advantageously connected to the control unit SE and May enable wired or/and wireless communication, for example via Bluetooth or WLAN.

Figure 2:
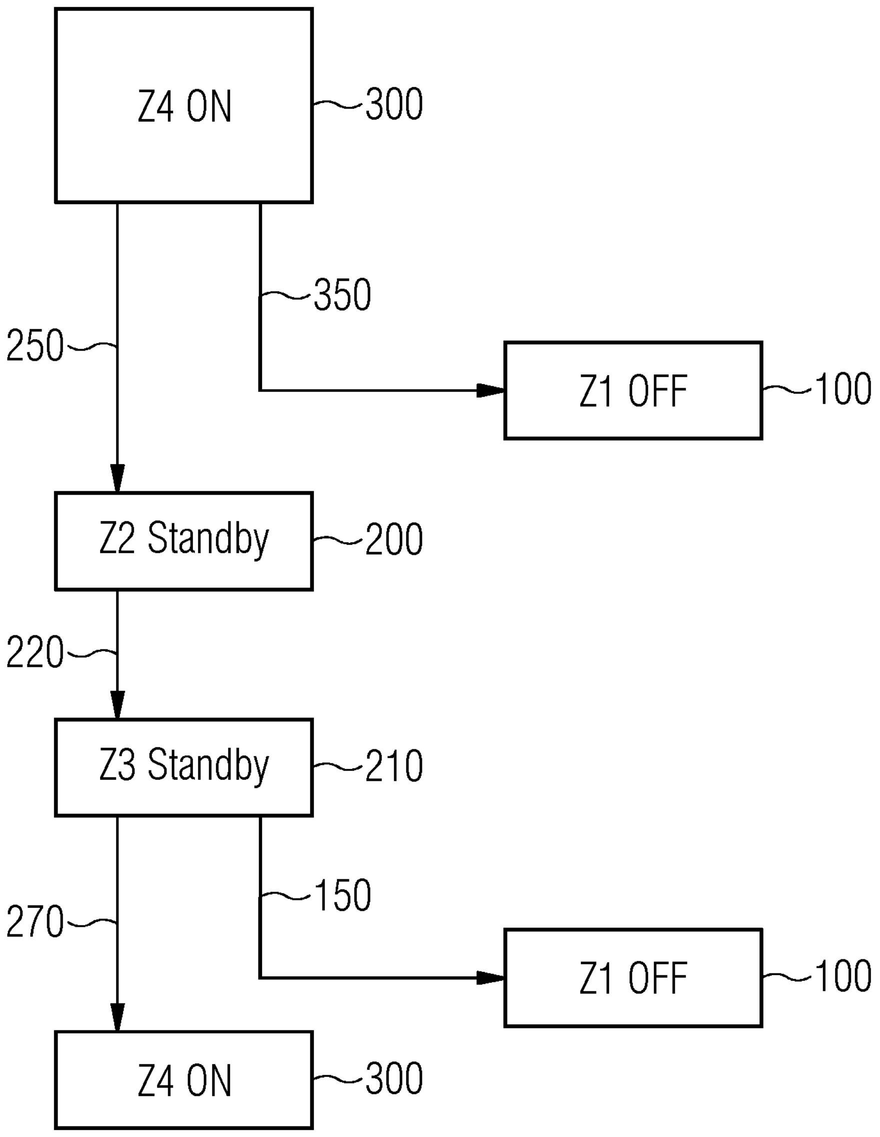
FIG. 2 shows a first illustration of states of a circuit breaker device.

FIG. 2 illustrates different states ON, OFF, standby of the circuit breaker device SG. FIG. 2 basically shows a flowchart for the behavior of the (network-voltage-dependent) circuit breaker device, in particular for detecting fault currents (differential currents), in the event of fluctuations of the voltage level of the low-voltage circuit (network voltage fluctuations).

In the switched-on state ON, 300, Z4, the device cyclically checks its own functionality. This concerns, for example, in particular the functionality of the electronic interruption unit EU and the functionality of the fault current sensor unit or (electronic) fault current measurement/differential current measurement. If a fault is detected in a unit or component, the circuit breaker device automatically changes to the safe, DC-isolated state OFF, 100, Z1, state change 350. That is to say, the contacts of the mechanical isolating contact unit MK are opened (by the control unit SE).

If the circuit breaker device is in the switched-on state ON, 300, Z4 and if the voltage in the low-voltage circuit falls below, for example, the lower limit of the operating voltage range of the circuit breaker device (may be equal to the upper limit of the voltage-reducing state), the electronic interruption unit EU is "switched off", that is to say has the high-impedance state, that is to say the standby state, 200, Z2 is assumed, state change 250.

The lower limit of the operating voltage range may be the voltage limit for the circuit breaker device's own functionality.

That is to say, the circuit breaker device does not change to the DC-isolated state OFF, as required by the standards for example, but rather the contacts still remain closed and only the electronic interruption unit comes to have a high impedance.

In the (approximately voltage-free) state, the circuit breaker device signals the standby state, 200, that is to say a voltage-free standby state, for example by means of the display unit DISP.

The electronic interruption unit can be switched off safely since it is possible to use, for example, normally open power semiconductors in the circuit breaker device that can be switched on only by applying a gate voltage.

If the device is in the voltage-reduced standby state 200 and the network voltage returns again or the network voltage exceeds the voltage limit for the device's own functionality or the lower limit of the operating voltage range, state change 220, the device changes to the standby state, 210, Z3. The electronic interruption unit could again come to have a low impedance here in principle. However, before the electronic interruption unit EU comes to have a low impedance again, a checking function carries out a self-test of the functionality of the circuit breaker device, in particular a self-test of the (network-voltage-dependent) determination of the differential current, during which at least one component, in particular a plurality of components, of a unit, in particular of a plurality of units, of the circuit breaker device is/are checked. If the at least one component, in particular a plurality of components, of a unit, in particular of a plurality of units, is/are functional, the low-impedance state is allowed.

If a fault is detected, the device automatically changes to the safe DC-isolated OFF state 100, Z1, state change 150.

If a fault is not detected, the circuit breaker device changes to the ON state, 300, Z4, state change 270, by virtue of the electronic interruption unit EU coming to have a low impedance.

The circuit breaker device SG cyclically carries out self-tests in the ON state, 300, Z4 for the functionality of the electronic interruption unit EU or its semiconductor-based switching elements and of the other units. In particular, the device carries out cyclical self-tests of the (network-voltage-dependent) determination of the differential current. As a result, a defect in the circuit breaker device is independently detected. In the event of a defect, the high-impedance state of the electronic interruption unit EU may be activated or preferably the contacts of the mechanical isolating contact unit MK can be opened, that is to say the DC-isolated state is independently established.

This is explained further below with reference to FIG. 3 using the states Z1, Z2, Z3 and Z4.

Figure 3:
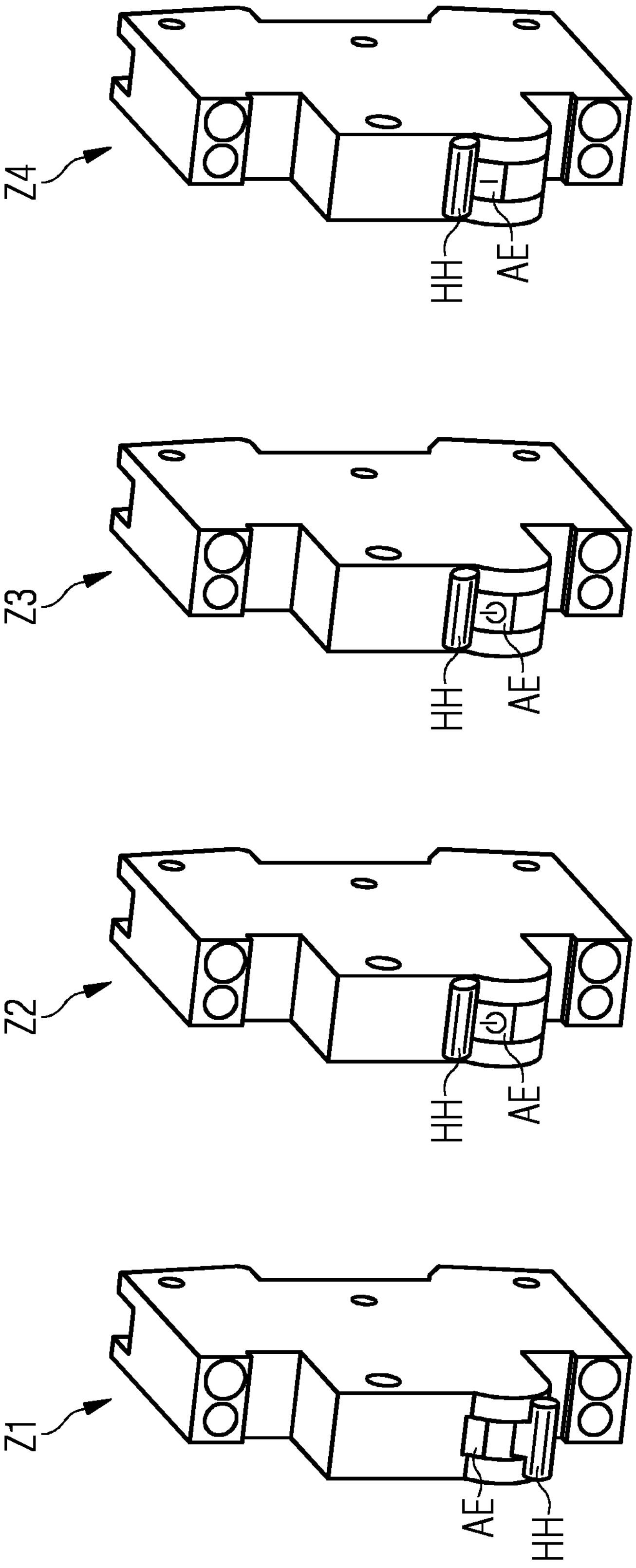
FIG. 3 shows a second illustration of a circuit breaker device.

FIG. 3 shows a possible external illustration of a circuit breaker device SG according to FIG. 1. FIG. 3 shows a circuit breaker device SG that can be mounted on a top-hat rail and has a width of, for example, 1 HP, 1.5 or 2 HP with two-pole connections (L, N).

In electrical installation and in switchgear cabinet construction, the width of built-in devices such as circuit breaker devices, miniature circuit breakers, fault current circuit breakers etc. is stated in horizontal pitch units, HP for short. The width of a horizontal pitch unit is 18 mm. The installation width of the devices is intended to be between 17.5 and 18.0 mm according to the DIN 43880:1988-12 standard, or is intended to be calculated by multiplying this dimension by 0.5 or an integer multiple thereof, that is to say: k×0.5×18 mm or k×0.5×17.5 mm (where k=1, 2, 3, . . . ). For example, a single-pole miniature circuit breaker has a width of 1 HP. The fittings of electrical installation distribution boards are matched to the horizontal pitch units, for example the width of mounting rails/top-hat rails, in accordance with DIN 43871 “Consumer units for built-in equipment up to 63 A”.

FIG. 3 shows the circuit breaker device SG with a handle HH for the mechanical isolating contact unit MK. The handle HH of the mechanical isolating contact unit MK can be operated by a user, that is to say connection and disconnection can be carried out. The circuit breaker device SG according to FIG. 3 has a display unit AE for displaying information on the circuit breaker device SG. In the example according to FIG. 3, the display unit AE is integrated in the handle HH.

The display unit AE has, for example, (at least) one light-emitting diode, for example a two-color light-emitting diode which can flash yellow or emit red light, for example. In the example according to FIG. 3, the light-emitting diode is partially concealed depending on the position of the handle.

In the first state 21, the circuit breaker device SG is disconnected and switched off, that is to say the mechanical isolating contact unit MK is open and the electronic interruption unit EU has a high impedance. The display unit AE displays, for example, a green state, for example by means of a color marking, at or in the region of the handle HH in the example.

In a second state 22, the circuit breaker device SG is connected and switched off, that is to say the mechanical isolating contact unit MK is closed and the electronic interruption unit EU has a high impedance. However, the circuit breaker device SG does not have an energy supply because the electrical low-voltage circuit is voltage-free, for example. The display unit AE displays, for example, a yellow state, for example by means of a color marking, at or in the region of the handle HH in the example.

In a third state 23, the circuit breaker device SG is connected but is still switched off, that is to say the mechanical isolating contact unit MK is closed and the electronic interruption unit EU has a high impedance. The circuit breaker device SG is supplied with energy (normal case). However, the circuit breaker device SG has not yet been switched on, that is to say current in the electrical low-voltage circuit cannot yet flow. In this state, the circuit breaker device SG carries out its checking function, for example. The display unit AE displays, for example, a flashing yellow state, for example by means of a flashing light-emitting diode, for example at or in the region of the handle HH.

In a fourth state 24, the circuit breaker device SG is connected and switched on, that is to say the mechanical isolating contact unit MK is closed and the electronic interruption unit EU has a low impedance. (The circuit breaker device SG is supplied with energy (normal case).) A current in the electrical low-voltage circuit can flow. In this state, the circuit breaker device SG has ended its checking function with a positive result, for example. The display unit AE displays, for example, a red state, for example by means of a light-emitting diode emitting red light, for example at or in the region of the handle HH. After a voltage failure and restored (potential) current flow or energy flow, a further display may be effected here in addition to or as an alternative to the “red” display, for example:

a simultaneous red and yellow display, a simultaneous red and orange display.

Figure 4:
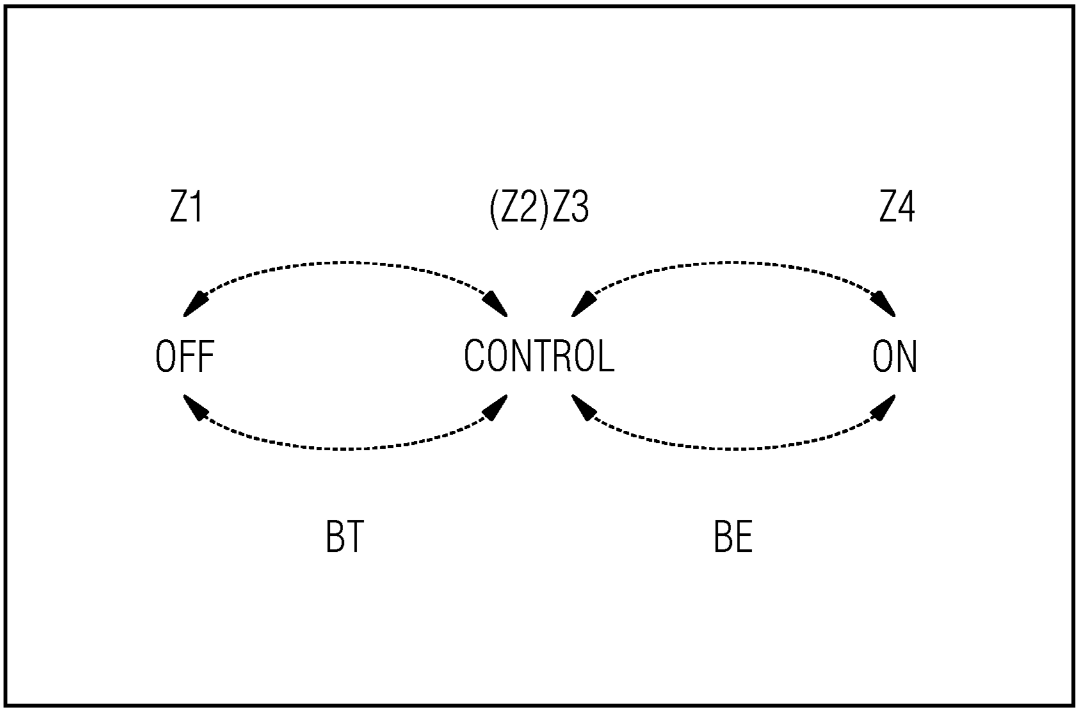
FIG. 4 shows a second illustration of states of a circuit breaker device.

FIG. 4 shows an illustration of the states Z1, Z2, Z3, Z4 of the circuit breaker device SG. In this case, the second and third states 22, 23 are combined to form mode control (=standby).

That is to say, the circuit breaker device SG has substantially three modes. A first mode OFF in which the mechanical isolating contact unit MK is open and the electronic interruption unit EU has a high impedance; a second mode CONTROL (=standby) in which the mechanical isolating contact unit MK is closed and the electronic interruption unit EU has a high impedance; a third mode ON in which the mechanical isolating contact unit MK is closed and the electronic interruption unit EU has a low impedance.

A change from the first mode OFF to the second mode CONTROL is possible only manually by a user by means of actuation BT of the handle. A change from the second mode CONTROL back to the first mode OFF is manually possible by a user by means of actuation BT of the handle and optionally by the control unit SE.

A change from the second mode CONTROL (=standby) to the third mode ON and back is only possible “automatically” by the circuit breaker device SG itself by means of an automatic 9 switching-on process BE (or automatic switching-off process—for example when a short-circuit condition is met). In particular, a change from the second mode CONTROL to the third mode ON cannot be forced by a user.

If the voltage-reduced state (for example voltage failure) is left, the connected circuit breaker device automatically returns to the low-impedance state/switched-on state/third state ON after the voltage has been applied again, depending on the configuration.

The checking function comprises a self-test of the functionality of the circuit breaker device. During this self-test, at least one component, in particular a plurality of components, of a unit, in particular of a plurality of units, of the circuit breaker device SG is/are checked. The low-impedance state is allowed if the checked components or units are functional.

A self-test of the functionality of at least one component of a unit of the circuit breaker device may involve values delivered to the control unit by the component of the unit or by the unit, for example the voltage sensor unit or fault current sensor unit, for example values of the determined level of the voltage or differential current, not exceeding defined limit values (upper or/and lower limit values).

A further self-test may involve briefly switching on the electronic interruption unit, that is to say briefly switching the semiconductor-based switching element to a low impedance. In this case, briefly is used to mean a certain period of time during which the instantaneous voltage value u(t) of the AC voltage does not exceed a certain value, for example 50 volts. For example, the AC voltage can be connected (electronic interruption unit EU has a low impedance) at the zero crossing of the AC voltage (0°) for approximately 444 μs/up to 8°, that is to say until the instantaneous voltage value of a maximum of 50 volts is reached.

Alternatively, it is also possible to switch on at approximately −8° (based on the zero crossing of the AC voltage), to pass through the zero crossing and to switch off again at +8°, that is to say for approximately 888 μs. That is to say, the switch-on period of time is less than 1 ms, in particular less than 0.9 ms, more specifically approximately 0.8 ms (or half in each case, depending on the switch-on time in each case).

Various units or their components can be checked by virtue of this brief switching-on:

the electronic interruption unit EU, the voltage sensor unit SU.

The self-test of the device may also comprise a temperature measurement, for example of the microprocessor or of the semiconductor-based switching elements. It is possible to check the control unit, for example, by monitoring the temperature at the microprocessor.

In addition to the self-test of the device, the checking function may also comprise a test of the low-voltage circuit, more specifically of the load-side or network-side connection. For example, it is possible to check at least one, in particular a plurality or all, of the following parameters:

- checking whether a first overvoltage value or/and a higher second overvoltage value or/and a higher third overvoltage value is/are exceeded, in particular at or in the region of the network-side connection,
- checking whether a first undervoltage value is undershot, in particular at or in the region of the network-side connection,
- checking parameters of the load-side connection, in particular checking whether a load-side first or/and second resistance value or a load-side first or/and second impedance value is/are undershot, in particular checking whether a load-side first or/and second differential current is exceeded.

Overvoltage and undervoltage values can be checked by means of measurements by the voltage sensor unit. The limit values can be stipulated as already described.

Depending on the implementation of the parameters to be checked, that is to say the preceding implementation:

- overvoltage information (voltage too high) can be emitted if the first overvoltage value is exceeded,
- the electronic interruption unit comes to have a high impedance if the second overvoltage value is exceeded (voltage level critical),
- the contacts are opened (disconnected) by means of the mechanical isolating contact unit if the third overvoltage value is exceeded (voltage level dangerous (for further operation of the device)),
- undervoltage information is emitted (device capable of working and capable of protection, but "voltage in the network too low") if the first undervoltage value is undershot, the electronic interruption unit remains with a high impedance if a third undervoltage value is undershot (voltage too low, device no longer capable of protection), in particular if the voltage level is greater than a second undervoltage value (otherwise no display or action can be performed since the voltage is too low),
- temperature information is emitted (increased temperature) if the first temperature limit value is exceeded,
- the electronic interruption unit comes to have a high impedance if the second temperature limit value is exceeded (critical temperature),
- the contacts are opened (disconnected) if the third temperature limit value is exceeded (temperature too high (for safe operation of the device)),
- impedance information is emitted (low-impedance consumer-overload?) if the load-side first resistance value or load-side first impedance value is undershot, or
- the electronic interruption unit remains with a high impedance if the load-side second resistance value or load-side second impedance value is undershot (short circuit on the load side).

Defined measures—warning—remain with a high impedance—DC isolation—can therefore be carried out in a graduated manner, depending on whether certain defined parameters are exceeded or undershot, which increases operational safety in the low-voltage circuit.

High impedance is used to mean a state in which only a current of a negligible magnitude flows. In particular, high impedance is used to mean resistance values of greater than 1 kiloohm, preferably greater than 10 kiloohms, 100 kiloohms, megohm, 10 megohms, 100 megohms, 1 gigaohm or greater.

Low impedance is used to mean a state in which the current value indicated on the circuit breaker device could flow. In particular, low impedance is used to mean resistance values of less than 10 ohms, preferably less than 1 ohm, 100 milliohms, 10 milliohms, 1 milliohm or less.

The invention has the advantage that no unsafe state can occur on account of an invalid (excessively low) network voltage.

- In the case of an excessively low network voltage, no undefined state can occur in the control unit, that is to say no undefined state can occur in the network-voltage-dependent differential current determination either.
- The device does not switch to the isolated state when the voltage limit is undershot.
- The device can switch on again after the valid network voltage returns.

In the event of an excessively low network voltage, no unprotected (live) state can occur on the load side even though a network-voltage-dependent differential current determination is being performed, since the electronic interruption unit is (automatically) switched off or switched to a high impedance.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker device for protecting an electrical low-voltage circuit, the circuit breaker device comprising:

a housing having network-side and load-side connections for conductors of the electrical low-voltage circuit;

a voltage sensor for determining a level of a voltage of the electrical low-voltage circuit;

a fault current sensor for determining a level of a differential current of the conductors of the electrical low-voltage circuit;

a mechanical isolating contact unit having contacts being switchable, with a result that an opening of said contacts avoids a current flow and a closing of said contacts allows the current flow in the electrical low-voltage circuit;

an electronic interruption unit connected in series with said mechanical isolating contact unit on a circuit side and being switched, by means of semiconductor-based switching elements, to a high-impedance state of said semiconductor-based switching elements to avoid the current flow or a low-impedance state of said semiconductor-based switching elements for the current flow in the electrical low-voltage circuit;

a controller connected to said voltage sensor, said fault current sensor, said mechanical isolating contact unit and said electronic interruption unit, wherein avoidance of the current flow in the electrical low-voltage circuit is switched in if a differential current limit value is exceeded; and the circuit breaker device is configured such that, when said contacts of the circuit breaker device are closed and said electronic interruption unit has the low-impedance state, said electronic interruption unit comes to have the high-impedance state when a voltage-reduced state of the electrical low-voltage circuit occurs, and that, after leaving the voltage-reduced state, said electronic interruption unit comes to have the low-impedance state again.

2. The circuit breaker device according to claim 1, wherein the voltage-reduced state is a voltage-free or approximately voltage-free state of the electrical low-voltage circuit, or in that an upper limit of the voltage-reducing state is less than or equal to a lower limit of an operating voltage range of the circuit breaker device.

3. The circuit breaker device according to claim 2, wherein the circuit breaker device is configured such that, above the upper limit of the voltage-reducing state, it is possible to determine the level of the differential current.

4. The circuit breaker device according to claim 1, wherein the circuit breaker device is configured to determine the level of the differential current of the conductors of the electrical low-voltage circuit, only when voltage is applied to the electrical low-voltage circuit.

5. The circuit breaker device according to claim 1, wherein a behavior of the circuit breaker device after leaving the voltage-reduced state is configured.

6. The circuit breaker device according to claim 1, wherein if the voltage-reduced state of the electrical low-voltage circuit occurs, said electronic interruption unit comes to have the high-impedance state before a determination of the differential current stops, and in that, after leaving the voltage-reduced state, said electronic interruption unit comes to have the low-impedance state again only when the determination of the differential current has started.

7. The circuit breaker device according to claim 1, further comprising an information display for displaying information on the circuit breaker device and said information display is connected to said controller.

8. The circuit breaker device according to claim 1, wherein said electronic interruption unit comes to have the low-impedance state after leaving the voltage-reduced state if a checking function allows the low-impedance state of said semiconductor-based switching elements.

9. The circuit breaker device according to claim 8, wherein the checking function includes a self-test of a functionality of the circuit breaker device, in which at least one component of a unit of the circuit breaker device is checked, and, in an event of the functionality of the at least one component of the unit, the low-impedance state is allowed.

10. The circuit breaker device according to claim 9, wherein the functionality of said electronic interruption unit is checked to determine whether said semiconductor-based switching elements are functional.

11. The circuit breaker device according to claim 9, wherein:

said voltage sensor is checked with regard to its functionality for determining the level of the voltage; and/or said fault current sensor is checked with regard to its functionality for determining the level of the differential current.

12. The circuit breaker device according to claim 8, wherein the checking function checks at least one of a following parameters:

checking whether the differential current limit value is exceeded;

checking whether a first overvoltage value and/or a second overvoltage value and/or a third overvoltage value is/are exceeded;

checking whether a first undervoltage value is undershot;

checking whether a first temperature limit value and/or a second temperature limit value and/or a third temperature limit value is/are exceeded; and checking parameters of at least one of the load-side connections.

13. The circuit breaker device according to claim 12, wherein:

overvoltage information is emitted if the first overvoltage value is exceeded;

said electronic interruption unit comes to have the high-impedance state if the second overvoltage value is exceeded;

said contacts are opened if the third overvoltage value is exceeded;

the first undervoltage information is emitted and/or said electronic interruption unit remains with the high-impedance state if the first undervoltage value is undershot;

temperature information is emitted if the first temperature limit value is exceeded;

said electronic interruption unit comes to have the high-impedance state if the second temperature limit value is exceeded;

said contacts are opened if the third temperature limit value is exceeded;

impedance information is emitted if a load-side first resistance value or load-side first impedance value is undershot; and said electronic interruption unit remains with the high impedance if a load-side second resistance value or a load-side second impedance value is undershot.

14. The circuit breaker device according to claim 1, wherein if said mechanical isolating contact unit is closed and said electronic interruption unit has the low impedance state, and:

if the differential current that exceeds a first differential current threshold value is determined, said electronic interruption unit comes to have the high-impedance state and said mechanical isolating contact unit remains closed; and if the differential current that exceeds a second differential current threshold value is determined, said electronic interruption unit comes to have the high-impedance and said mechanical isolating contact unit is opened.

15. The circuit breaker device according to claim 1, wherein the circuit breaker device is configured such that said contacts of said mechanical isolating contact unit can be opened, but not closed, by said controller.

16. The circuit breaker device according to claim 1, further comprising a mechanical handle and said mechanical isolating contact unit is operated by means of said mechanical handle, with a result that opening of said contacts in order to avoid the current flow or closing of said contacts for the current flow in the electrical low-voltage circuit is switched by means of said handle.

17. The circuit breaker device according to claim 1, further comprising a communication unit connected to said controller and emits a message relating to said electronic interruption unit coming to have the low-impedance state after a voltage has been applied again.

18. The circuit breaker device according to claim 1, wherein said circuit breaker device is configured such that position information relating to said contacts is determined and is transmitted to said controller.

19. The circuit breaker device according to claim 1, further comprising a mechanical handle and said mechanical isolating contact unit is manually operated by means of said mechanical handle to switch the opening of said contacts in order to avoid the current flow or the closing of said contacts for the current flow.

20. The circuit breaker device according to claim 1, wherein the circuit breaker device is configured such that said electronic interruption unit comes to have the low-impedance state again after leaving the voltage-reduced state only when said contacts are closed.

21. A method for operating a circuit breaker device to protect an electrical low-voltage circuit, which comprises the steps of:

determining, with a fault current sensor, a level of a differential current of the electrical low-voltage circuit;

switching a mechanical isolating contact unit having contacts, with a result that opening of the contacts avoids a current flow and closing of the contacts allows the current flow in the electrical low-voltage circuit;

switching an electronic interruption unit which is connected in series with the mechanical isolating contact unit on the circuit side, by means of semiconductor-based switching elements, to a high-impedance state of the semiconductor-based switching elements to avoid the current flow or the low-impedance state of the semiconductor-based switching elements for the current flow in the electrical low-voltage circuit;

comparing a determined level of the differential current with at least one differential current limit value and avoidance of the current flow in the electrical low-voltage circuit is switched if the at least one differential current limit value is exceeded, wherein, when the contacts of the circuit breaker device are closed and the electronic interruption unit has the low-impedance state, the electronic interruption unit comes to have the high-impedance state when a voltage-reduced state of the electrical low-voltage circuit occurs; and switching the electronic interruption unit to come to have the low-impedance state again after leaving the voltage-reduced state.

22. The method according to claim 21, wherein a behavior of the circuit breaker device is configured such that the electronic interruption unit comes to have the low-impedance state or to remain with the high-impedance state after leaving the voltage-reduced state.

23. A non-transitory computer program product comprising stored computer executable instructions which, when executed by a microcontroller, cause the microcontroller to change an operating state of an electronic interruption unit for the circuit breaker device according to claim 1.

24. A non-transitory computer-readable storage medium comprising computer executable instructions which, when the computer executable instructions are executed by a microcontroller, cause the microcontroller to change an operating state of an electronic interruption unit for the circuit breaker device according to claim 1.

* * * * *